Figure 3:
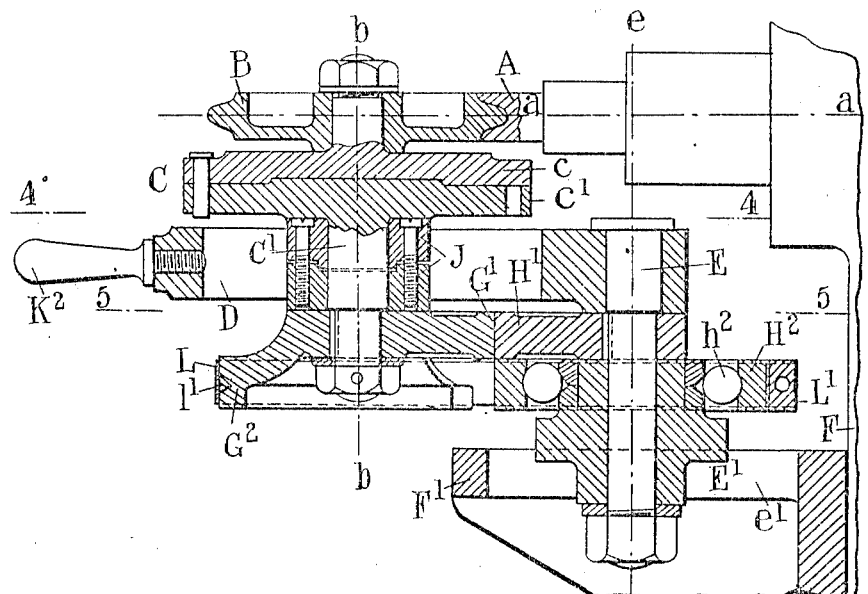

F. HUMPHRIS.
APPARATUS FOR MAKING TOOTHED GEARING.
APPLICATION FILED JUNE 18, 1910.
1,040,684.
Patented Oct. 8, 1912.
3 SHEETS—SHEET 1.
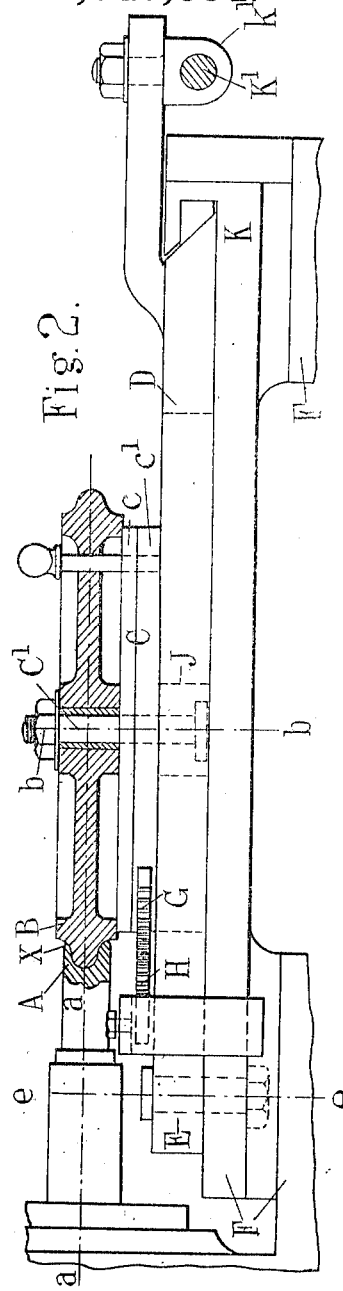
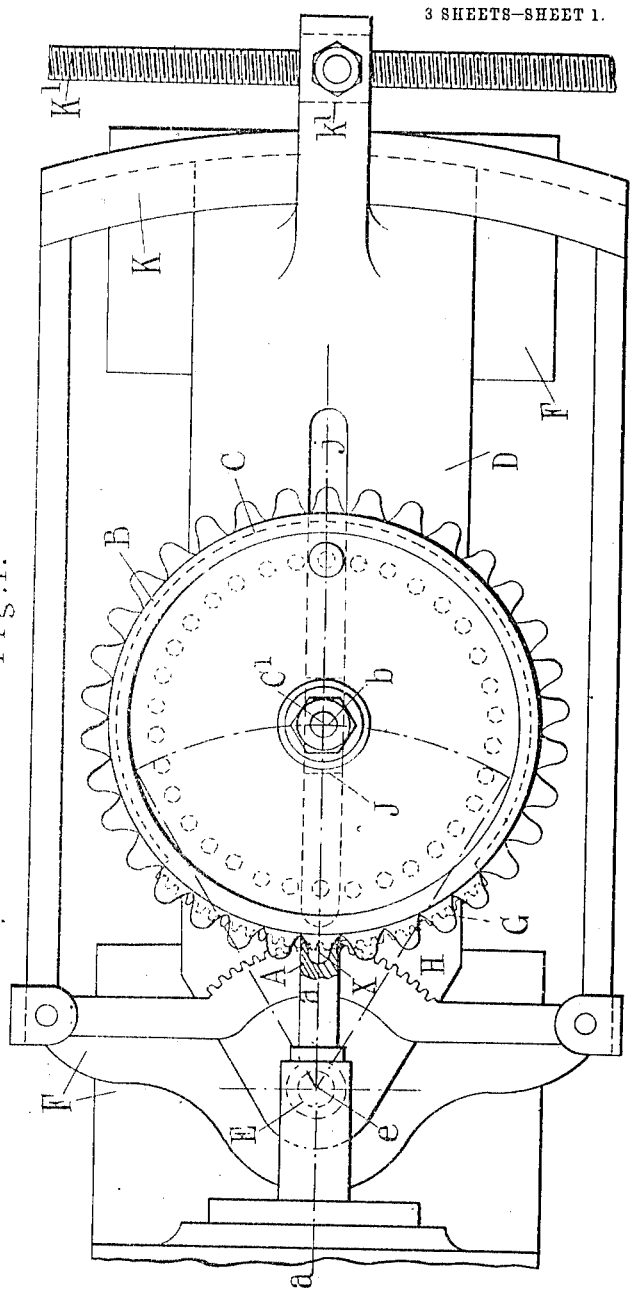
WITNESSES
J. P. Davis
INVENTOR
Frank Humphris
BY
ATTORNEYS F. HUMPHRIS.
APPARATUS FOR MAKING TOOTHED GEARING.
APPLICATION FILED JUNE 18, 1910.

1,040,684.

Patented Oct. 8, 1912.

3 SHEETS—SHEET 2.

WITNESSES

INVENTOR
Frank Humphris
BY
ATTORNEYS

F. HUMPHRIS.
APPARATUS FOR MAKING TOOTHED GEARING.
APPLICATION FILED JUNE 18, 1910.
1,040,684.
Patented Oct. 8, 1912.
3 SHEETS—SHEET 3.
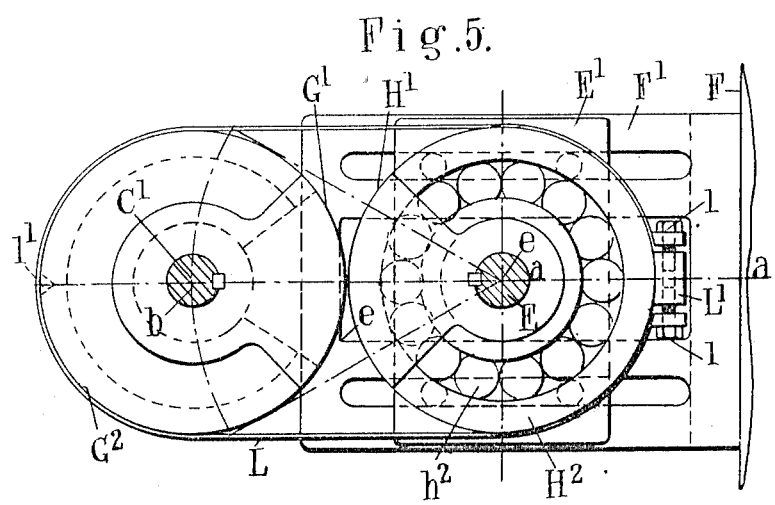

UNITED STATES PATENT OFFICE.

FRANK HUMPHRIS, OF BARTON PEVERIL, EASTLEIGH, ENGLAND, ASSIGNOR TO THE HUMPHRIS ENGINEERING SYNDICATE LIMITED, OF LONDON, ENGLAND.

APPARATUS FOR MAKING TOOTHED GEARING.

1,040,684.

Specification of Letters Patent.

Patented Oct. 8, 1912.

Application filed June 18, 1910. Serial No. 567,582.

*To all whom it may concern:*

Be it known that I, FRANK HUMPHRIS, a subject of the King of Great Britain, and resident of Barton Peveril, Eastleigh, in the county of Hampshire, England, engineer, have invented certain new and useful Apparatus for Making Toothed Gearing, of which the following is a specification.

This invention relates to apparatus for producing the operative surfaces of the so-called "generated" motion-transmitting elements in gearing wherein the operative surface of a motion transmitting element in one member is produced by the generative action of a rotary cutter having an effective profile which represents the operative surface of the coacting element in the other member of the gearing.

The invention relates more particularly to generating apparatus for use in the production of the operative surfaces of the helmet-shaped teeth and correspondingly shaped recesses or holes constituting the generated elements in the well-known "Humphris" type of gearing described and illustrated in United States Patent No. 859,662 dated July 9, 1907, and United States pending application Serial No. 467,154.

The invention consists in the combination with means whereby the entire movement (hereinafter called "the generating movement") required to produce an effect equivalent to that of the proper relative motion at the predetermined velocity-ratio between the respective members of the gearing, each regarded as a whole, is communicated either to the work alone, of means whereby further relative movement (hereinafter called "the feed movement") between the work and the cutter, each regarded as a whole, may be produced in a direction corresponding to that of the perpendicular to the common tangent to the pitch-lines of both members of the gearing. The invention is thus distinguished from generative apparatus for use in the production of the operative surfaces of motion-transmitting elements in gearing of other kinds than those referred to above, and wherein a rotary cutter representing the operative surface of a motion-transmitting element in one member of the gearing is employed to generate the operative surface of the coacting element in the other member of the gearing; inasmuch as, although in some cases it has been proposed to communicate either to the work alone, or to the cutter alone, the entire movement required to produce an effect equivalent to that of the proper relative motion at the predetermined velocity-ratio between the respective members of the gearing, no provision has heretofore been made for producing further relative movement between the work and the cutter in a direction corresponding to that of the perpendicular to the common tangent to the pitch-lines of both members of the gearing.

In the case of gearing of the "Humphris" type, wherein the motion-transmitting elements are constituted by helmet-shaped teeth and correspondingly shaped recesses or holes on the respective members, and more especially in cases where (as in the preferred form of said type of gearing) the maximum thickness of each tooth and the minimum thickness of the material which separates two adjacent holes, measured on the pitch-lines of the respective members of the gearing, is approximately 0.7 and 0.3 of the pitch respectively, it is necessary to provide means for producing (as above set forth) relative movement between the work and the cutter, each regarded as a whole, in a direction corresponding to that of the perpendicular to the common tangent to the pitch-lines of both members of the gearing, for the reason that, owing to the excessive (although varying) amount of strain, not directly balanced, to which during the generating operation the cutter is subjected in directions not coincident with its axis of rotation, it is found impracticable to produce on the work a complete surface presenting the true "generated" configuration unless the total depth of cut is performed in progressive stages, the depth of mutual engagement between the work and the cutter being gradually increased at successive traversing movements of the work and cutter relatively to one another, from a minimum to the maximum required. Generating apparatus constructed in accordance with the present invention further enables the necessary strength of parts, length of bearings, and consequent stability to be obtained (particularly in the case of the cutter-spindle) which are essential to the attainment of mechanically perfect results in the manufacture more especially of gearing of small dimensions.

Figure 4:
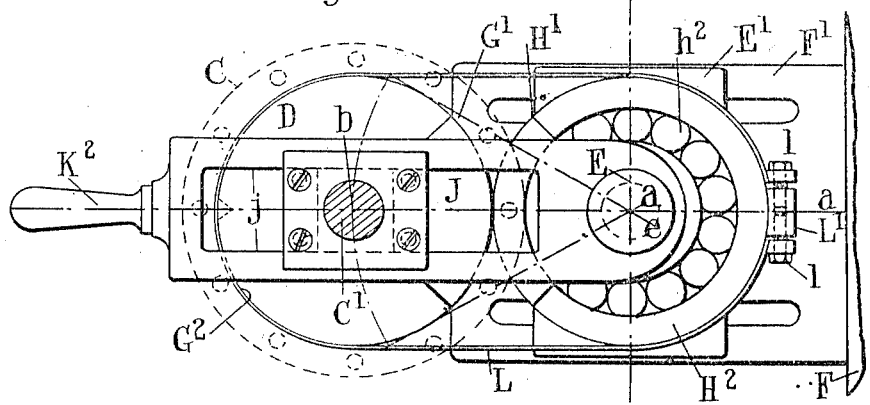

In the accompanying drawings which represent (in a somewhat elementary form) certain typical embodiments of the invention, Figure 1 is a plan view and Fig. 2 is a side elevation of mechanism for generating teeth or holes in the periphery of either member of a pair of spur-wheels (i. e. gear wheels rotatable in the same plane with one another), the gearing being external. Fig. 3 is a sectional side elevation, and Figs. 4 and 5 are plan views taken respectively on lines 4—4 and 5—5 of Fig. 3, showing a modified form of generating mechanism for use in the production of external spur-wheels.

In the drawings, parts of the mechanism which perform corresponding functions are, in general, denoted by the same or similar reference symbols.

Referring first to the mechanism illustrated in Figs. 1 and 2, which is adapted to generate teeth or holes in the periphery of either member of a pair of external spur-wheels; A represents the cutter which is caused to rotate about its axis of symmetry $a$—$a$ by being mounted in a tool-holder on the end of a horizontal spindle which may be driven and controlled in any convenient manner such for example as that employed in ordinary milling machines. The rough wheel or blank B is mounted to rotate in a horizontal plane so that the axis $a$—$a$ of the cutter shall lie in the plane of rotation of the wheel, the blank being carried by the intermittently-rotatable upper member $c$ of a dividing-head C adapted to enable the blank to be turned about its own vertical axis $b$—$b$, between successive generating operations, through an angle equal to that separating the adjacent teeth or holes to be produced, and to be locked, between these successive turning movements, against such rotation about its own axis.

The dividing-head C is mounted on a carrier D which is adapted to receive such angular motion, in a plane parallel to the plane of rotation of the blank B, as will truly represent that absolute motion of the axis $b$—$b$ of the blank which is the equivalent of the true relative motion between the axes of the two members of the gearing whereof the wheel produced from the blank is to constitute one; this angular motion of the carrier D being performed about a stationary axis $e$—$e$ constituted by a vertical gudgeon E mounted upon or engaging with some fixed portion F of the machine. The axis $e$—$e$, which represents the axis of the other member of the gearing, is parallel to the axis $b$—$b$ of the blank and intersects the axis $a$—$a$ of the cutter at a distance from the point thereof equal to the corresponding radius of the wheel whereof the cutter A represents one hole (or tooth).

The dividing-head C, to which the blank B is locked during each generating operation, is freely rotatable relatively to the carrier D, about a vertical axis coincident with the axis $b$—$b$ of the blank, this axis being represented by a stud or spindle $C^1$, whereon the lower member $c^1$ of the dividing-head is mounted; while means are provided for giving to the dividing-head C the requisite rotary movement about the spindle $C^1$ at the proper velocity-ratio, during the generating operation. For this purpose the arrangement illustrated comprises a toothed circular segment G fixed to and concentric with the lower member $c^1$ of the dividing-head C and having a pitch-radius equal to that of the wheel to be produced from the blank, and a second toothed segment H in gear with the first, fixedly mounted concentrically with the axis $e$—$e$ about which the whole carrier D is movable, and having a pitch-radius equal to that of the wheel with which the wheel to be produced is required to work in gear. With such a construction it will be seen that, when the carrier D is oscillated about its stationary axis $e$—$e$, the blank B will not only move bodily with reference to the cutter A (the axis $b$—$b$ of the blank passing to and fro across the axis $a$—$a$ of the cutter prolonged), but will also rotate in the corresponding direction about its own axis $b$—$b$ along with the dividing-head C, with the result that (assuming the amplitude of the oscillation to be sufficient) the tooth X (or hole) produced on the blank B by the cutter A will display the characteristic shape required.

In order to accommodate blanks of different diameters, the dividing-head C may be mounted on the carrier D not directly, but through the medium of a slide-block J with reference to which the dividing-head is rotatable, this slide-block, which carries the spindle $C^1$, being adjustable on guides $j$ which extend parallel to a line drawn through the stationary axis $e$—$e$ of the carrier and the axis $b$—$b$ of the dividing-head and blank so that the distance between these axes may be varied as required.

The carrier D, which is supported by a fixed segmental guide K concentric with the axis $e$—$e$, may be moved about said axis by any convenient means, such for example as a tangent-screw $K^1$ engaging a nut $k^1$ attached to the carrier.

In place of the two toothed segments G and H above described, plain circular segments, having radii respectively equivalent to those of the toothed segments, may be employed, the periphery of that plain segment (corresponding to G) which is fixed to the dividing-head C rolling in frictional contact with the periphery of the stationary segment (corresponding to H). In this construction, provision must be made for maintaining such frictional contact between the respective plain segments as is necessary to eliminate all possibility of the occurrence of slip during the rolling movement of one upon the other; for which purpose the two segments may be drawn tightly together by means of a flexible but inextensible connection or connections lapped about their respective surfaces.

Figs. 3 to 5, show a convenient construction suited for the production of external spur-gearing of a smaller size than that for which the mechanism illustrated in Figs. 1 and 2 is more especially designed.

In Figs. 3, 4 and 5 the stationary cutter A is rotated about its horizontal axis of symmetry $a$—$a$ by any convenient means, while the blank wheel B is carried by the upper and intermittently rotatable member $c$ of a dividing-head C as before. The blank B, during each generating operation, is rotated along with the dividing-head C about the common vertical axis $b$—$b$ of both, at the proper velocity-ratio, while said axis is at the same time caused to move across the axis $a$—$a$ through an angle equal to that between two teeth or holes to be produced in the blank, this angular movement taking place about a stationary vertical gudgeon E whose axis $e$—$e$ represents that of the wheel whereof the cutter A constitutes the equivalent of one tooth or hole. For this purpose there is rotatably mounted on the fixed gudgeon E, a carrier D constituted by a radius-arm whereon the dividing-head C is supported, the lower member $c^1$ of the dividing-head being fast on a central vertical spindle $C^1$ which is journaled in a bearing provided in a block J whose distance from the gudgeon E is adjustable (by movement in a slot $j^1$ on the radius-arm D) to agree with the distance apart of the axes $b$—$b$ and $c$—$c$ representing the axes of the respective members of the gearing. Fast on the lower end of the spindle $C^1$ is a plain circular segment $G^1$ whose radius is equal to that of the pitch-circle of the blank B and whose operative surface rolls in frictional contact with that of another plain circular segment $H^1$ fixed concentrically with the gudgeon E and having a radius equal to that of the pitch-circle of the wheel whereof the cutter represents one hole (or tooth); the line of mutual contact between the segments $G^1$ and $H^1$ lying in the common plane of the axes $b$—$b$ and $e$—$e$, and being situated between said axes.

The requisite frictional contact between the rolling surfaces of the segments $G^1$ and $H^1$ is insured by means of a flexible metal band L which on the one hand is lapped about a plain segment $G^2$, complementary (as regards angular extent and position) to the segment $G^1$ and of equal radius therewith but situated in a plane out of the common plane of the segments $G^1$ and $H^1$, the band L embracing that portion of the segment $G^2$ which is remote from the axis $e$—$e$. The band L on the other hand is lapped about a ring $H^2$ which is mounted to rotate (preferably on ball-bearings $h^2$ as indicated) about the axis $e$—$e$, the band L embracing that portion of the ring $H^2$ which is remote from the axis $b$—$b$.

For the purpose of maintaining the requisite tension in the band L, its opposed ends are shown as adjustably drawn together by means of set-screws $l$, $l$, entering tapped holes in a block $L^1$ fixed to and projecting from the periphery of the segment $H^2$; while the effect of the positive engagement thus (in addition to the frictional contact) established between the band L and segment $H^2$, is reinforced by means of a stud $l^1$ attached to the band and entering a recess in the segment $G^2$; the stud $l^1$ and block $L^1$ being situated at the sides of the respective segments which are remote from one another.

The gudgeon E, whose axis $e$—$e$ intersects the axis $a$—$a$ of the cutter A, is adjustable along the latter axis for the purpose of enabling the distance of the axis $e$—$e$ from the end of the cutter A to be varied to agree with the radius of the wheel whereof the cutter represents one hole (or tooth). For this purpose the gudgeon E is shown as mounted in a block $E^1$ adjustable on a horizontal guide $e^1$ provided in a table $F^1$ which in turn is vertically adjustable upon a fixed part F of the machine.

The machines above specified are only described by way of example, and it will be obvious that their arrangement and construction may be considerably varied in detail provided the result aimed at remains the same in each case. It will moreover be evident that by the employment of devices whereby the direction of the bodily movement of the work and cutter relatively to one another is made rectilinear instead of rotary, machines (otherwise similar to those described) can be designed for the production of rack-and-pinion gearing according to the same general system of generation which has been specified with regard to the forms of the mutually coacting surfaces of the teeth and holes in the respective members of the gearing.

Having now particularly described and ascertained the nature of the said invention and in what manner the same is to be performed, I declare that what I claim is:—

1. In apparatus for producing the operative surface of a motion transmitting element in one member of peg and hole gearing by the generative action of a rotary cutter member having an effective profile which represents the operative surface of the coacting element in the other member of the gearing, the combination with means for communicating to one of the said members, the entire movement required to produce an effect equivalent to that of the proper relative motion with the predetermined velocity ratio between the respective members of the gearing, each regarded as a whole, of means whereby further relative movement between the work and the cutter, each regarded as a whole, may be produced in a direction corresponding to that of the perpendicular to the common tangent plane to the pitch surfaces of both members of the gearing, the common axis of symmetry and of rotation of the cutter being also perpendicular to said common tangent plane when the prolongation of said common axis intersects the axis of rotation of the work, substantially as set forth.

2. In apparatus for producing the operative surface of a motion transmitting element in one member of peg and hole external spur gearing by the generative action of a rotary cutter having an effective profile which represents the operative surface of the coacting element in the other member of the gearing, the combination with means for communicating to the work alone, the entire movement required to produce an effect equivalent to that of the proper relative motion with the predetermined velocity ratio between the respective members of the gearing, each regarded as a whole, of means for producing further movement of the cutter toward the work in a direction corresponding to that of the perpendicular to the common tangent plane to the pitch surfaces of both members of the gearing, the common axis of symmetry and of rotation of the cutter being also perpendicular to said common tangent plane when the prolongation of said common axis intersects the axis of rotation of the work, substantially as set forth.

FRANK HUMPHRIS.

Witnesses:
 ADA LOUISE THORNTON,
 NORA BRIDGE.